United States Patent
Trapani et al.

(10) Patent No.: US 11,749,039 B2
(45) Date of Patent: *Sep. 5, 2023

(54) ELECTRONIC ACCESS CONTROL SYSTEM AND METHOD FOR ARC FLASH PREVENTION

(71) Applicant: Security Enhancement Systems, LLC, Northbrook, IL (US)

(72) Inventors: Matthew Frank Trapani, Deerfield, IL (US); Stacey Lee Krutz-Sabol, Attica, MI (US)

(73) Assignee: Security Enhancement Systems, LLC, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,128

(22) Filed: Aug. 9, 2022

(65) Prior Publication Data
US 2023/0035016 A1 Feb. 2, 2023

Related U.S. Application Data

(63) Continuation of application No. 16/904,314, filed on Jun. 17, 2020, now Pat. No. 11,410,479.
(Continued)

(51) Int. Cl.
*G07C 9/00* (2020.01)
*G06Q 50/26* (2012.01)

(52) U.S. Cl.
CPC ....... *G07C 9/00571* (2013.01); *G06Q 50/265* (2013.01)

(58) Field of Classification Search
CPC ...... G07C 9/00571; G07C 2009/00769; G07C 9/00896; G06Q 50/265
See application file for complete search history.

(56) References Cited

U.S. PATENT DOCUMENTS 7,965,486 B2 * 6/2011 Land, III ............... G01J 1/429
                                                    361/115
8,068,323 B2 * 11/2011 Mughal ................. H01H 85/24
                                                    337/225
(Continued)

OTHER PUBLICATIONS

Extended European Search Report, European application No. 20827231.0, dated May 22, 2023. European Patent Office, Munich, DE.

*Primary Examiner* — Quan Zhen Wang
*Assistant Examiner* — Mancil Littlejohn, Jr.
(74) *Attorney, Agent, or Firm* — Gregory Finch; Finch Paolino, LLC

(57) ABSTRACT

An integrated arc flash safety system and methods for remote access control and safety compliance. An electronic access control system may comprise an enclosure having a door, a door lock device, an electronic access control unit, and an arc sensor. The access controller comprises electronic hardware and software for sensor/detection operation, door lock device operation, door lock actuation, and wireless remote communication. The door lock device may be controlled by the access controller in combination with the arc sensor. The access controller may facilitate remote access control via a smart mobile computing device (e.g., mobile phone) and telecommunication with a remote cloud server via a communication network (e.g., Internet). Embodiments of the present disclosure enable rapid detection of an arc flash precondition or event within an enclosure and warning generation as well as protection and standard compliance measures to improve technician safety.

20 Claims, 13 Drawing Sheets

Related U.S. Application Data

(60) Provisional application No. 62/862,532, filed on Jun. 17, 2019.

(56) References Cited

U.S. PATENT DOCUMENTS

| | | | |
|---|---|---|---|
| 11,410,479 B2* | 8/2022 | Trapani | G06Q 50/265 |
| 2008/0081516 A1* | 4/2008 | Brandt | H02B 13/025 |
| | | | 439/638 |
| 2010/0045464 A1* | 2/2010 | Knopf | F16P 3/147 |
| | | | 340/5.1 |
| 2017/0269128 A1* | 9/2017 | Bugaris | G01R 19/155 |

* cited by examiner

ELECTRONIC ACCESS CONTROL SYSTEM AND METHOD FOR ARC FLASH PREVENTION

CROSS-REFERENCE TO RELATED APPLICATIONS

This application is a continuation of U.S. application Ser. No. 16/904,314 filed on Jun. 17, 2020, which claims the benefit of U.S. Provisional Application Ser. No. 62/862,532, filed on Jun. 17, 2019 entitled "ARC FLASH ACCESS CONTROLLED SAFETY COMPLIANCE AND PROTECTION SYSTEM," the disclosures of each of which are hereby incorporated in their entirety at least by reference.

FIELD

The present disclosure relates to the field of electronic access control systems; in particular, an electronic access control system and method for mitigating an arc flash precondition within an access-controlled enclosure.

BACKGROUND

An arc flash is the light and heat produced from an electric arc supplied with sufficient electrical energy to cause substantial damage, harm, fire, or injury. Electrical arcs experience negative incremental resistance, which causes the electrical resistance to decrease as the arc temperature increases. Therefore, as the arc develops it gets hotter as the resistance drops, drawing more and more current (runaway) until some part of the system melts, trips, or evaporates, providing enough distance to break the circuit and extinguish the arc.

An arc flash occurs during a fault, or short circuit condition, which passes through an arc gap. The arc flash can be initiated through accidental contact, equipment that is underrated for the available short circuit current, contamination or tracking over insulated surfaces, deterioration or corrosion of equipment and/or parts, as well as other causes. An arc flash event can expel large amounts of deadly energy. The arc causes an ionization of the air, and arc flash temperatures can reach as high as 35,000 degrees Fahrenheit. This kind of temperature can set fire to clothing and severely burn human skin in fractions of a second at a significant distance from the event. The heat can also result in ignition of any nearby combustible materials.

Arc flashes have occurred in many industrial environments. These occurrences can result in severe and even lethal impacts to a technician that happens to be exposed to an arc flash while servicing cabinets and other types of enclosures and apparatus. Arc flashes have occurred frequently enough in various industries to require several safety standards that require adherence from companies in order to improve the safety environment of individuals.

There are many examples of industries that have arc flash safety issues such as in telecommunications, energy and rail. One scenario that occurs is when an outdoor enclosure, such as a cabinet, experiences an arc flash precondition and a field technician unlocks and opens the enclosure, causing the arc flash to occur upon opening and resulting in severe injury or death. There are various standards in place to help ensure safety measures are taken to protect individuals. For example, NFPA 70E requirements for safe work practices to protect personnel by reducing exposure to major electrical hazards. Originally developed at OSHA's request, NFPA 70E helps companies and employees avoid workplace injuries and fatalities due to shock, electrocution, arc flash, and arc blast, and assists in complying with OSHA 1910 Subpart S and OSHA 1926 Subpart.

Section 5(a)(1) of the Occupational Health and Safety Act states that employers "shall furnish to each of his employees' employment and a place of employment which are free from recognized hazards that are causing or are likely to cause death or serious physical harm to his employees."

OSHA Standards 29 CFR, Parts 1910 and 1926. Occupational Safety and Health Standards. Part 1910, subpart S (electrical) Sections 1910.332 through 1910.335 contain generally applicable requirements for safety-related work practices. On Apr. 11, 2014, OSHA adopted revised standards for electric power generation, transmission, and distribution work at part 1910, Section 1910.269 and part 1926, subpart V, which contain requirements for arc flash protection and guidelines for assessing arc-flash hazards, making reasonable estimates of incident heat energy from electric arcs, and selecting appropriate protective equipment (79 FR 20316 et seq., Apr. 11, 2014[18]). All of these OSHA standards reference NFPA 70E.

The National Fire Protection Association (NFPA) Standard 70-2014 "The National Electrical Code" (NEC) contains requirements for warning labels. See NEC Article 110.16 & NEC Article 240.87. NFPA 70E 2012 provides guidance on implementing appropriate work practices that are required to safeguard workers from injury while working on or near exposed electrical conductors or circuit parts that could become energized. The Canadian Standards Association's CSA Z462 Arc Flash Standard is Canada's version of NFPA70E, released in 2008. Other industry standards include the Underwriters Laboratories of Canada's Standard on Electric Utility Workplace Electrical Safety for Generation, Transmission, and Distribution CAN/ULC S801. The Institute of Electronics and Electrical Engineers IEEE 1584-2002 Guide to Performing Arc-Flash Hazard Calculations.

Through applied effort, ingenuity, and innovation, Applicant has identified the safety problems associated with access to enclosures that exhibit an arc flash precondition state. Applicant has developed a solution that is embodied by the present disclosure, which is described in detail below.

SUMMARY

In order to provide a basic understanding of the invention, the following is a simplified summary of certain embodiments thereof. This summary is not an extensive and is not intended to identify key/critical elements of the invention or to delineate the scope of the invention. Its sole purpose is to present embodiments of the invention in a simplified form as a prelude to the more detailed description that is further below.

An object of the present disclosure is an integrated system for an enclosure containing electrically powered equipment, remote access control and safety compliance. The integrated system comprises an enclosure having a door, a door lock device, an electronic access control unit, and an arc sensor. In various embodiments, the access controller comprises electronic hardware for sensor operation, door lock device operation, door lock actuation, and wireless remote communication. In various embodiments, the door lock device is controlled by the access controller in combination with the arc sensor. In various embodiments, the access controller enables remote access control via a smart mobile computing device (e.g., mobile phone) and telecommunication with a remote cloud server via a communication network (e.g., Internet). In various embodiments, the one or more enclosure comprises cabinets, poles, enclosures containing electrically powered equipment, electrical switchgear, motor control center, or the like. In various embodiments, the said enclosure may be an enclosure possessing an arc flash precondition state.

An object of the present disclosure is one or more methods for controlling access to an enclosure. In various embodiments, the methods comprise one or more processes for controlling access to enforce safety compliance. The one or more methods are executed using one more component of said integrated system, including but not limited to a(n): enclosure, door, door lock device, door lock actuator, electronic access control unit, arc sensor. In various embodiments, the access controller contains stored instructions for executing, including but not limited to, arc sensor operation, door lock device operation, door lock actuation, and wireless remote communication. In various embodiments, the methods comprise at least one process for controlling the door lock device in combination with the arc sensor. In various embodiments, the methods comprise a process for detecting one or more means or sensors of arc flash precondition detection, including but not limited to heat, smoke, ohm phase deviation, electromagnetic radiation/emission, electromagnetic spike, ultrasound, magnetic, fiber optic, point sensor, resistive, current, voltage, optical modulation, picture, video, combinations thereof, or the like. In various embodiments, the method comprises a process for detecting an arc flash event and communicating said event to the access controller, the access controller subsequently communicating said event to one or more users via one or more said communication network.

An object of the present disclosure is one or more processes for controlling access to enforce safety compliance. In various embodiments, the one or more processes include, but are not limited to, arc flash detection, access lock down, safety procedures, temporary safety compliance access, arc flash resolution, standard access, safety audit reporting, and combinations thereof. In various embodiments, an arc flash sensor detects a precondition for an arc flash and communicates it to the access controller through alarm, switch and/or network interfaces. In various embodiments, access is denied from any standard code that a technician uses to unlock the enclosure. In various embodiments, safety procedures are followed such as management notification and engagement of a trained technician with appropriate safety gear. In various embodiments, temporary access only is granted for a particular individual once safety compliance has been approved by an independent observer for the enclosure and skilled technician. In various embodiments, one or more arc flash root issue is resolved before enclosure access is allowed. In various embodiments, standard access is reengaged by compliance approved individuals or external observer by using a code and/or application configuration change. In various embodiments, reports and real-time notifications reflect all steps that occurred for the enclosure. In various embodiments, reports enable after-action analyses and future prevention.

An object of the present disclosure is an Enclosure Safety Management System (herein after "ESMS") for the management worker or technician safety comprising at least one non-limiting: enclosure and access controller, firmware, middleware, gateway, router, API, communication network, cloud server, database, client device (e.g., mobile, desktop, etc.), client portal, and one or more applications residing on a cloud backend server. In various embodiments, the application cloud server comprises one or more software application operating to send, receive at least one data, instructions, protocol, message, text message, SMS, event, or command for execution, email, processing, analysis, prediction, broadcast, or communication relating to technician safety management. In various embodiments, the one or more remote server is accessible through one or more client computing devices, including but not limited to desktop, laptop, tablet, mobile phone, smart phone, or the like. In various embodiments, the software environment enables, but is not limited to, device registration, worker authentication, support, monitoring, and safety awareness, or the like. In various embodiments, one or more application enables the configuration of processes for access lock down, safety procedures, temporary safety compliance access, arc flash resolution, standard access, safety audit reporting, and combinations thereof. In various embodiments, the said middleware facilitates one or more said applications, application components, software to enable the processing of at least one sensor data from an electronic access control unit, device message, instruction, protocol, resource request, get, put, event, or information. In various embodiments, the said application, residing on an application cloud server, is operably engaged with at least one application database, the application cloud server being communicably connected to the electronic access control unit via a wireless communication network, the said devices being operable to communicate to the application cloud server, optionally in real time, via an internetworking communication network, including but not limited to cellular network or the Internet. In various embodiments, at least one application processes one or more data, message, protocol, instructions, or communication stored within the application database according to one or more application logic instructions. In various embodiments, at least one application enables the analysis of one or more data, message, protocol, instructions, or communication received and stored within the application database for prediction and/or provides safety guidance to one or more users, including worker and technician. In various embodiments, a client device (e.g., mobile phone, mobile computing device, PC, etc.) is communicably engaged with the application cloud server, the client device comprising one or more graphical user interface (GUI) being operable to run one or more current instance, historical instance, prediction, recommendation, or combinations thereof, of an ESMS application via a Web browser, an equivalent browser on a desktop, a mobile computing platform, a native mobile application, or a mobile phone. In various embodiments, an application provides access for at least one external CRM system or enterprise or cloud system(s).

Aspects of the present disclosure provide for an arc flash safety system comprising an enclosure having a door, the enclosure having an arc flash precondition state; a door lock device operably engaged with the door; an electronic access control unit operably engaged with the door lock device, the electronic access control unit comprising electronic hardware configured for sensor operation, door lock device operation, door lock actuation, and wireless remote communication, the electronic access control unit being communicably engaged with a remote cloud server via a communication network; and, an arc sensor operably engaged with the door lock device and the electronic access control unit, the arc sensor being configured to detect a precondition for an arc flash and communicate the precondition to the electronic access control unit.

Aspects of the present disclosure provide for a method of preventing an arc flash in an enclosure, the method comprising detecting, with an arc flash sensor, a precondition for an arc flash in an enclosure; communicating, via a network interface, the precondition from the arc flash sensor to an access controller; denying, with the access controller, access to the enclosure; verifying, with the access controller, compliance with one or more safety protocols; granting, with the access controller, temporary access to the enclosure to an authorized user; verifying, via one or more user inputs, a resolution of the precondition for the arc flash in the enclosure; and, enabling, with the access controller, standard access protocols for the enclosure.

Further aspects of the present disclosure provide for an electronic access control system comprising at least one sensor configured to detect at least one arc flash precondition or arc flash event for an enclosure; a controller communicably engaged with the at least one sensor to receive a sensor input, the controller comprising at least one wireless communications interface configured to wirelessly receive an access request from a mobile electronic device, the controller being configured to actuate at least one locking mechanism to grant access to the enclosure in response to authorizing the access request according to one or more access parameters; and a remote server communicably engaged with the controller to receive sensor data associated with the sensor input, the remote server comprising at least one processor operably engaged with at least one non-transitory computer-readable medium having one or more processor-executable instructions stored thereon that, when executed, cause the at least one processor to perform one or more operations, the one or more operations comprising processing the sensor data to determine at least one arc flash precondition or arc flash event for the enclosure; configuring the one or more access parameters to deny the access request in response to the sensor data being indicative of at least one arc flash precondition or arc flash event; and configuring at least one arc flash safety protocol in response to the sensor data being indicative of at least one arc flash precondition or arc flash event.

In accordance with certain embodiments of the present disclosure, the mobile electronic device may be communicably engaged with the remote server via a wireless communication network. The mobile electronic device may comprise at least one electronic access control application comprising a graphical user interface. The graphical user interface may be configured to present one or more user prompts and receive one or more user inputs according to the at least one arc flash safety protocol. In certain embodiments, the one or more operations of the processor may further comprise receiving the one or more user inputs from the mobile electronic device and processing the one or more user inputs to evaluate one or more safety and compliance parameters.

In accordance with certain aspects of the present disclosure, the one or more operations of the processor may further comprise configuring the one or more access parameters to authorize an access request for an authorized user, wherein the authorized user satisfies the one or more safety and compliance parameters. The one or more operations of the processor may further comprise processing the one or more user inputs and/or the sensor data to determine a resolution state for at least one arc flash precondition or arc flash event. In some embodiments, the one or more operations of the processor may further comprise restoring one or more standard access parameters in response to resolving the at least one arc flash precondition or arc flash event. In some embodiments, the one or more operations of the processor may further comprise assembling safety audit data for the enclosure. The one or more operations of the processor may further comprise communicating the safety audit data to one or more client devices.

Further aspects of the present disclosure provide for an electronic access control method comprising detecting, with at least one sensor communicably engaged with a controller comprising at least one processor, an occurrence of a precondition for an arc flash in an enclosure; communicating, with the controller via a communications interface, the precondition for the arc flash to at least one remote server or mobile electronic device; restricting, with the controller, access to the enclosure in response to the precondition for an arc flash in the enclosure; verifying, with the at least one remote server, user compliance with one or more arc flash safety protocols; configuring, with the at least one remote server communicably engaged with the controller, temporary access to the enclosure to an authorized user; verifying, with the at least one remote server, a resolution of the precondition for the arc flash in the enclosure; and, enabling, with the access controller, one or more standard access protocols for the enclosure in response to the resolution of the precondition for the arc flash.

In accordance with certain aspects of the present disclosure, the electronic access control method may further comprise revoking, with the at least one remote server, one or more user access permissions in response to the precondition for an arc flash in the enclosure. The method may further comprise communicating, with the at least one remote server via the communications interface, the one or more arc flash safety protocols to the mobile electronic device. In some embodiments, the method may further comprise receiving, with the mobile electronic device, one or more user inputs in response to the one or more arc flash safety protocols. The method may further comprise communicating, with the mobile electronic device via the communications interface, the one or more user inputs to the at least one remote server.

In accordance with certain aspects of the present disclosure, the electronic access control method may further comprise communicating, with the least one remote server via the communications interface, the precondition for the arc flash to at least one client device. In some embodiments, the method may further comprise assembling, with the at least one remote server, safety audit data for the enclosure. In some embodiments, the one or more user access permissions may comprise at least one electronic access code. In some embodiments, the controller may be operably engaged with at least one electronic locking device configured to selectively restrict access to the enclosure. In accordance with certain aspects of the present disclosure, the electronic access control method may further comprise disabling, with the at least one remote server, the at least one electronic access code in response to the precondition for an arc flash in the enclosure.

Still further aspects of the present disclosure provide for a non-transitory computer-readable medium encoded with instructions for commanding one or more processors to execute operations for preventing an arc flash in an enclosure, the operations comprising receiving sensor data comprising one or more sensor inputs from an interior portion of the enclosure; processing the sensor data to determine at least one arc flash precondition or arc flash event for the enclosure; restricting one or more electronic access permissions for the enclosure in response to the sensor data being indicative of at least one arc flash precondition or arc flash event; and configuring at least one arc flash safety protocol in response to the sensor data being indicative of at least one arc flash precondition or arc flash event.

The details of one or more implementations of the present disclosure are set forth in the accompanying drawings and description, below. Other potential features of the disclosure will be apparent from the description and drawings, and from the claims.

BRIEF DESCRIPTION OF DRAWINGS

The above and other embodiments, features and aspects of the present disclosure will be more apparent from the following detailed description taken in conjunction with the accompanying drawings, in which.

DETAILED DESCRIPTION

Figure 1:
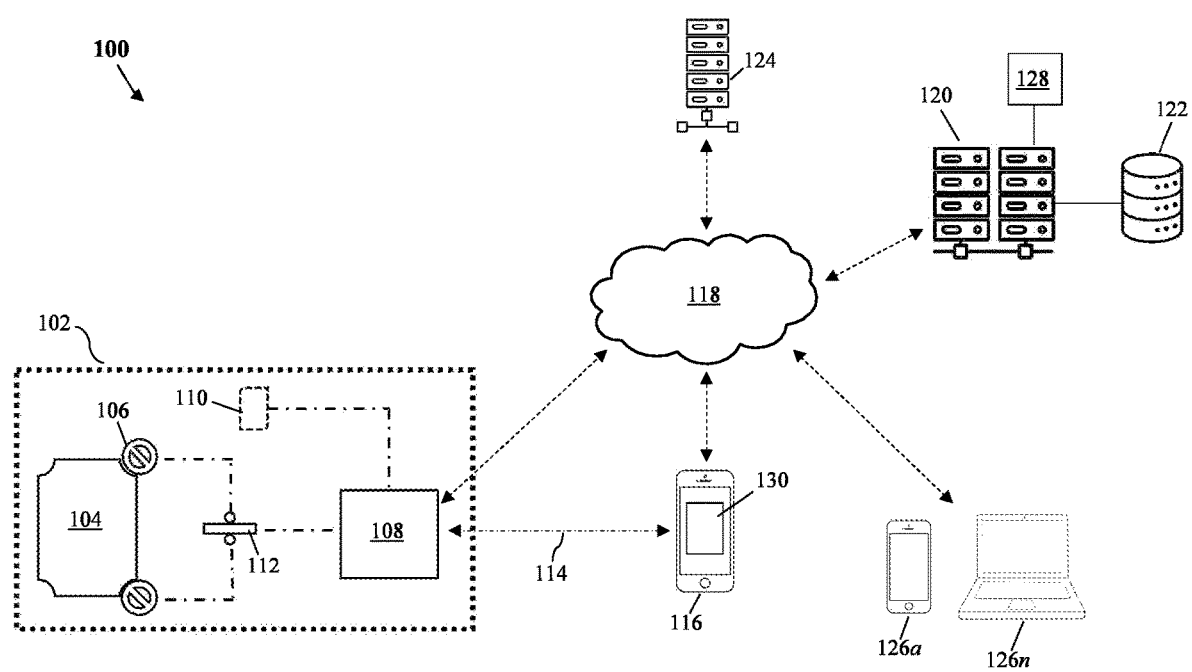
FIG. 1 is an architecture diagram of an electronic access control system, in accordance with certain aspects of the present disclosure.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, inventive systems, devices, methods and non-transitory computer-readable media having instructions stored thereon to enable one or more said systems, devices and methods for an electronic access control system configured to detect a precondition of an arc flash in an enclosure and restricting access to the enclosure until the precondition for the arc flash is mitigated and/or resolved.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein the term "Internet of Things" or "IoT" refers to a network of physical objects, devices, vehicles, buildings and other items, embedded with electronics, software, sensors, and network connectivity that enables these objects to collect and exchange data with one or more other objects, devices or data sources.

As used herein, the term "packet" refers to any formatted unit of data that may be sent and/or received by an electronic device.

As used herein, the term "payload" refers to any part of transmitted data that constitutes an intended message and/or identifying information.

As used herein, the term "interface" refers to any shared boundary across which two or more separate components of a computer system may exchange information. The exchange can be between software, computer hardware, peripheral devices, humans, and combinations thereof.

All definitions, as defined and used herein, should be understood to control over dictionary definitions, definitions in documents incorporated by reference, and/or ordinary meanings of the defined terms. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

Certain aspects of the present disclosure provide for systems, methods, and devices to identify and mitigate risk of occurrence of, and injury from, an arc flash when accessing an enclosure containing electrically powered equipment that might be in an arc flash precondition state. Embodiments of the present disclosure provide for an integrated arc flash safety system and methods for remote access control and safety compliance. An electronic access control system may comprise an enclosure having a door, a door lock device, an electronic access control unit, and an arc sensor. The access controller comprises electronic hardware and software for sensor/detection operation, door lock device operation, door lock actuation, and wireless remote communication. The door lock device may be controlled by the access controller in combination with the arc sensor. The access controller may facilitate remote access control via a smart mobile computing device (e.g., mobile phone) and telecommunication with a remote cloud server via a communication network (e.g., Internet). Embodiments of the present disclosure enable rapid detection of an arc flash precondition or event within an enclosure and warning generation as well as protection and standard compliance measures to improve technician safety.

Exemplary systems, methods, and devices of the present disclosure enable one or more electronic access control protocols for controlling access to an enclosure containing electrically powered equipment, including, but not limited to, one or more protocols for arc flash detection, access lock down, safety procedures, temporary safety compliance access, arc flash resolution, standard access, safety audit reporting, and combinations thereof. In accordance with various embodiments of the present disclosure, electronic access may be denied from any standard code that a technician uses to unlock an enclosure containing electrically powered equipment according to the one or more electronic access control protocols. In various embodiments, one or more communication protocols and resolution workflows, such as management notification and engagement of a trained technician with appropriate safety gear, may be executed in response to one or more control parameters. In accordance with certain aspects of the present disclosure, one or more conditional and/or temporary access rights may be granted to execute certain safety protocols. In various embodiments, one or more arc flash root issue is resolved before enclosure access is allowed by the system. In various embodiments, standard access is reengaged by compliance approved individuals or external observer by using a code and/or application configuration change.

Turning now descriptively to the drawings, in which similar reference characters denote similar elements throughout the several views, FIG. 1 depicts an architecture diagram of an electronic access control system 100. In accordance with certain aspects of the present disclosure, system 100 is configured to restrict and/or disable standard access protocols for an access-controlled enclosure upon detection of an arc flash precondition within the enclosure and restore standard access protocols upon a resolution of the arc flash precondition. In accordance with certain embodiments, system 100 may comprise an enclosure 102 having a door 104, at least one door lock device 106, an electronic access control unit (ACU) 108, and at least one sensor 110. Enclosure 102 may comprise an enclosure containing electrically powered equipment, electrical switchgear, motor control center, or the like. In certain embodiments, sensor 110 may be configured to detect one or more conditions within enclosure 102 being correlated with an arc flash precondition. The one or more conditions may include temperature/heat, ohm phase deviance, internal environmental electromagnetic spikes and/or other arc flash preconditions. In certain embodiments, sensor 110 may comprise one or more temperature sensor, voltage sensor, e-field sensor, h-field sensor and/or other sensors configured to detect one or more variables associated with an arc flash precondition. In various embodiments, ACU 108 may comprise electronic circuitry to command and control one or more operations of sensor 110, door lock device 104, actuator 112, and wireless communication via a bi-lateral network connection 114 (e.g. Bluetooth, wi-fi, ethernet connection, and the like).

In accordance with certain aspects of the present disclosure, system 100 may comprise at least one mobile electronic device 116, one or more remote server 120, at least one database 112 communicably engaged with server 120, one or more client devices 126a-126n, and, optionally, one or more third-party servers/services 124. In accordance with an embodiment, mobile electronic device 116 is communicably engaged with ACU 108 over wireless communications interface 114, and may comprise a smartphone, tablet computer, laptop computer, and the like. Wireless communications interface 114 may comprise one or more wireless communications protocols such as Bluetooth, Wi-Fi, LoRA, RF, near field communication (NFC), and the like. In certain embodiments, mobile electronic device 116 comprises an electronic access control application 130. Electronic access control application 130 may be native to mobile electronic device 116 or may be a web-based application executed over an instance of an Internet browser of mobile electronic device 116. Electronic access control application 130 may be configured to authenticate a user and enable the user to configure and communicate an electronic access request; for example, entering an access code for enclosure 102 via a graphical user interface of electronic access control application 130. In certain embodiments, mobile electronic device 116 and/or electronic access control application 130 may be associated with a user being authorized to access enclosure 102; for example, a service technician authorized to service one or more electrical components being housed within enclosure 102. Electronic access control application 130 may be configured to package the access request and mobile electronic device 116 may be configured to communicate a data packet comprising the access request to ACU 108 via wireless communications interface 114. ACU 108 may be configured to process the access request according to one or more authorization parameters. In accordance with various aspects of the present disclosure, ACU 108 is configured to process sensor data from one or more inputs from sensor 110 to determine whether the sensor data exceeds a predetermined sensor data threshold corresponding to one or more arc flash preconditions. If the sensor data exceeds the threshold, ACU 108 may deny the access request from mobile electronic device 116. If the sensor data does not exceed the threshold, ACU 108 may process the access request according to standard authorization and authentication parameters and grant access in response to the access request being valid. In accordance with various aspects of the present disclosure, ACU 108 is communicably engaged with server 120 via a network connection 118. Network connection 118 may comprise an Internet connection or other wide area network interface. ACU 108 may establish a data transfer interface with network connection 118 via one or more wireless communications interface, such as LTE, 4G, 5G, WiFi or LoRA, or a wireline communications interface, such as an Ethernet cable or other data cable. In some embodiments, communication between ACU 108 and server 120 may be tunneled through mobile electronic device 116 via wireless communications interface 114. Mobile electronic device 116 may be communicably engaged with server 120 via network connection 118. Server 120 may be configured to execute a server-side electronic access control application 128. Server-side electronic access control application 128 may be configured to send and receive data from electronic access control application 130. Server-side electronic access control application 128 may be configured to configure one or more user access permissions and user authentication parameters; configure one or more arc flash safety and compliance parameters for enclosure 102, including establishing one or more sensor threshold values for determining an arc flash precondition; provisioning ACU 108 with standard access parameters, sensor thresholds, and temporary access parameters; configuring one or more safety and compliance workflows within electronic access control application 130, including configuring one or more graphical user interface(s); sending and receiving communications between ACU 108, mobile electronic device 116, one or more client devices 126a-126n, and, optionally, one or more third-party servers/services 124; processing data received from ACU 108, mobile electronic device 116, one or more client devices 126a-126n, and, optionally, one or more third-party servers/services 124 to determine compliance with one or more arc flash safety protocols; configuring one or more temporary access protocols and parameters for temporary access to enclosure 102 in response to an arc flash precondition; processing data received from ACU 108, mobile electronic device 116, one or more client devices 126a-126n, and, optionally, one or more third-party servers/services 124 to determine a resolution of the precondition for the arc flash in the enclosure; and, restoring one or more standard access protocols for the enclosure in response to the resolution of the arc flash precondition.

Figure 2:
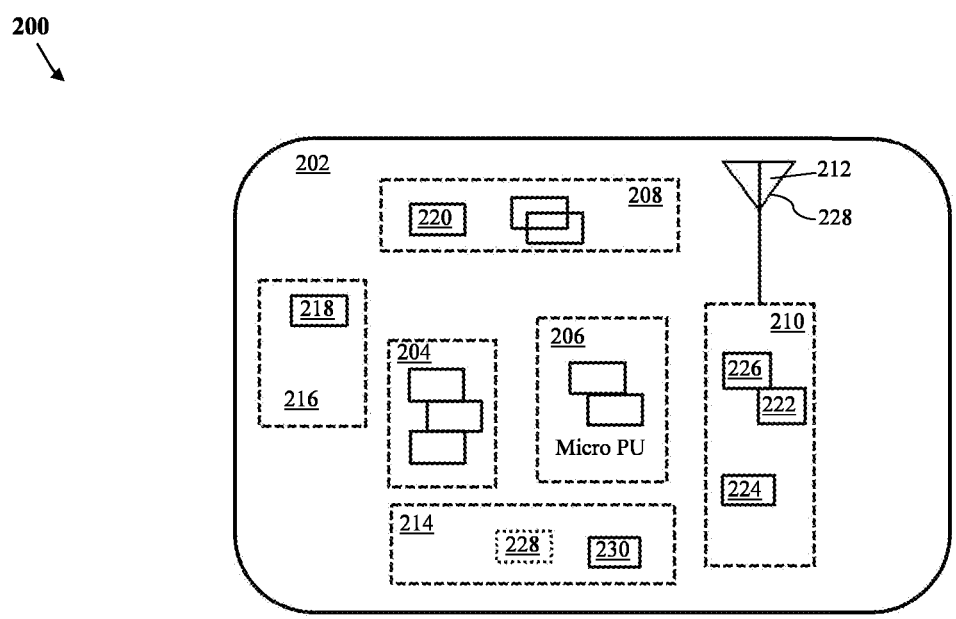
FIG. 2 is a schematic block diagram of an Electronic Access Control Unit, in accordance with certain aspects of the present disclosure.

Referring now to FIG. 2, with cross-reference to FIG. 1, a schematic block diagram 200 illustrating an Electronic Access Control Unit (ACU) 202 is shown. In accordance with various aspects of the present disclosure, ACU 202 may be embodied as ACU 108 as shown in FIG. 1. In accordance with certain embodiments, ACU 202 comprises one or more analog-to-digital (A/D) module 204 (optional), microcontroller module 206, memory storage module 208, wireless communication module 210, antenna 212, power module 214, and an actuator module 216. In various embodiments, the actuator module 216 comprises at least one electrical driver relay 218 (e.g., actuator 112 of FIG. 1) to actuate one or more door lock device (e.g. door lock device 106 of FIG. 1). In certain embodiments, electrical driver relay 218 may actuate other components of enclosure 102 of FIG. 1; including, but not limited to, an electromagnetic actuation component, rod, a bolt, a hinge, a flap, or the like, that controls a physical access to said enclosure. In various embodiments, A/D module 204 comprises at least one analog-to-digital converter, signal amplifier, signal filter (optional), circuit elements, including but not limited to resistor, capacitor, diode, the like, or combinations thereof, to enable the acquisition of an arc sensor, including sensor 110 of FIG. 1. In various embodiments, the controller module 206 comprises at least one microcontroller, a microprocessor, a CPU, the like, or combinations thereof. In a preferred embodiment, microcontroller module 206 comprises an embedded real-time operating system being tuned and optimized for low power consumption. In various embodiments, memory storage module 208 comprises at least one transitory/non-transitory memory storage device 220 (e.g., Flash, RAM, ROM, EPROM, etc.). In various embodiments, wireless communication module 210 comprises at least one transceiver 222, configured to operate as a transmitter-receiver, using one or more communication means, technology, network, protocol, or standard, including but not limited to, Bluetooth, BLE, Wi-Fi, RF, UHF, LC, LAN, WAN, GPS, cellular, the like, or combinations thereof. In a preferred embodiment, communication module 210 comprises a Bluetooth transceiver 222, and a GPS transceiver 224 (optional), and optionally network I/O interface 226 for communication via Ethernet. In various embodiments, the antenna module 228 comprises one or more antenna 212. In various embodiments, power module 214 comprises at least one battery 228, optionally rechargeable. In an embodiment, power module 214 comprises optionally at least one direct connection 230 to a power source of a machine, equipment, plant or facility. In various embodiments, power module 214 provides energy to one or components of system 100 of FIG. 1. In various embodiments, one or more components or combinations of components of the ACU 202 can be implemented as one or more embedded system, ASIC, SoC and the like, and combinations thereof. In other embodiments, firmware may be incorporated to simplify one or more function of one or more hardware component of ACU 202. In various embodiments, ACU 202 is integrated within one or more control unit or system of a powered machine or electrical equipment stored within enclosure 102 of FIG. 1.

Certain aspects of the present disclosure include one or more software, stored instructions, or applications being stored on memory storage device 220 and executed on controller module 206 to command one or more operations within system 100 of FIG. 1. In various embodiments, one or more software stack running on controller module 206 includes, but is not limited to, an Internet of Things (IoT) Operating System (OS), a Hardware Abstraction, a software layer that enables access to the hardware features of a microprocessor, memory storage device, GPIOs, serial interfaces, etc., Communication Support, drivers and one or more protocols such as Bluetooth, BLE, Z-Wave, Thread, CAN bus, MQTT, Representational State Transfer (REST), RESTful, RESTful web service, Constrained Application Protocol (CoAP), etc.; and enabling device communication, and Remote Management for the remote control of controller module 206 to provision, update and upgrade firmware, battery level, and other operating instructions, including access permissions and sensor data thresholds. In various embodiments, one or more libraries can be deployed for stack development. In various embodiments, one or more libraries comprises instructions pertaining to methods for controlling access to an enclosure to enforce safety standards for preventing, managing, mitigation and/or resolving one or more arc flash preconditions. In various embodiments, one or more instructions include machine-to-machine communication or IoT interactions. The one or more methods include but are not limited to, arc sensor operation, door lock device operation, door lock actuation, and wireless remote communication. In various embodiments, the methods comprise at least one process for controlling a door lock device in combination with one or more sensors (or sensor suite) to detect one or more arc flash precondition. In various embodiments, the methods comprise a process for detecting one or more means or sensors of arc flash precondition detection, including but not limited to heat, smoke, ohm phase deviation, electromagnetic radiation/emission, electromagnetic spike, ultrasound, magnetic field, fiber optic, point sensor, resistive, current, voltage, optical modulation, digital images or videos, and combinations thereof. In various embodiments, ACU 202 serves as a resource providing one or more safety statuses (e.g., output) for an enclosure to one or more receiving clients. In various embodiments, a resource further stores one or more Uniform Resource Identifier (URI), Uniform Resource Name (URN), Uniform Resource Locator (URL) or the like, of a device or output as sub-resources. In various embodiments, sub-resources may comprise a sensor output, ACU transmission data, client control parameters to define safety features for controlling enclosure access, instructions to trigger door lock actuator, and the like.

Figure 3:
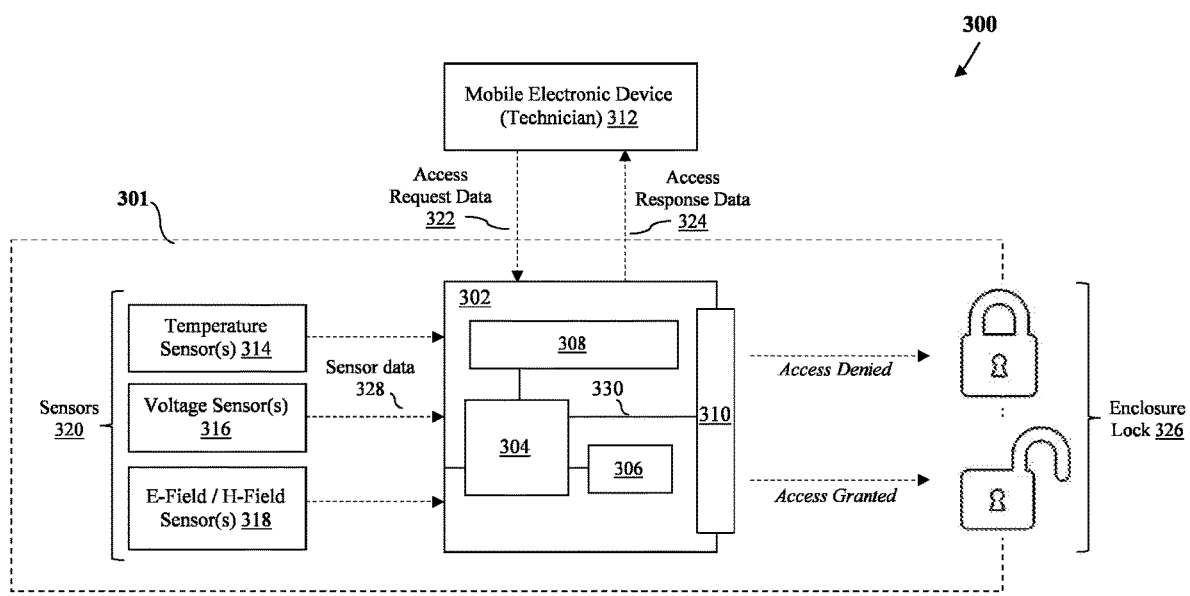
FIG. 3 is a functional block diagram of an electronic access control system, in accordance with certain aspects of the present disclosure.

Referring now to FIG. 3, with cross-reference to FIGS. 1 and 2, a functional block diagram of an electronic access control system 300 is shown. In accordance with certain aspects of the present disclosure, system 300 may be embodied within or as a subsystem of system 100 of FIG. 1. In accordance with certain aspects of the present disclosure, system 300 may be configured to continuously assess and determine an arc flash precondition within an interior area of an enclosure 301, and selectively restrict access to enclosure 301 in response to the presence of an arc flash precondition within the interior area of enclosure 301. System 300 comprises an electronic access control unit 302, a mobile electronic device 312, and one or more sensors 320. In accordance with various aspects of the present disclosure, electronic access control unit 302 may be embodied as ACU 108 of FIG. 1 and/or ACU 202 of FIG. 2; mobile electronic device 312 may be embodied as mobile electronic device 116 of FIG. 1; and sensors 320 may be embodied as sensor 110 of FIG. 1. In accordance with various embodiments, mobile electronic device 312 may be associated with an authorized user of an electronic access control application comprising one or more credentials or authorization permissions for accessing enclosure 301; for example, a service technician being authorized to access enclosure 301 for the purpose of executing one or more service tasks. In accordance with various embodiments, mobile electronic device 312 sends a wireless signal comprising a data packet containing a payload comprising access request data 322 to ACU 302. ACU 302 may receive the signal at a wireless communications module 308 comprising at least one antenna and communicate the data packet to processor 304 via system bus 330. Processor 304 may receive and process access request data 322 in accordance with one or more processing instructions stored on memory device 306 to grant or deny the access request. In accordance with various aspects of the present disclosure, the one or more data processing instructions may comprise one or more instructions for receiving sensor data 328 and processing sensor data 328 to determine whether sensor data 328 exceeds one or more arc flash safety thresholds. In certain embodiments, sensor data 328 may be collected by sensors 320 and communicated to processor 304 via wireless communications module 308 and/or system bus 330. In certain embodiments, sensors 320 may comprise one or more temperature sensor 314, voltage sensor 316, and E-Field/H-Field sensor 318. In accordance with various aspects of the present disclosure, processor 304 may process sensor data 328 according to the one or more data processing instructions to determine whether sensor data 328 exceeds one or more arc flash safety thresholds. If sensor data 328 exceeds a sensor data threshold value, then processor 304 denies the access request and maintains enclosure lock 326 in a locked state.

If sensor data 328 does not exceed the sensor data threshold value, then processor 304 processes the access request data in accordance with predetermined authorization and authentication parameters being stored in memory device 306. If the access request is valid/authenticated, then processor 304 sends a signal via system bus 330 to electronic locking circuitry 310 to configure enclosure lock 326 to an unlocked state. Processor 304 may be configured to assemble an access response communication (e.g., grant/denial of access request and presence/absence of arc flash precondition) and communications module 308 may be configured to transmit a signal comprising a data packet including access response data 324 to mobile electronic device 312. Mobile electronic device 312 may be configured to process access response data 324 and display the access response communication to a user of mobile electronic device 312.

Figure 4:
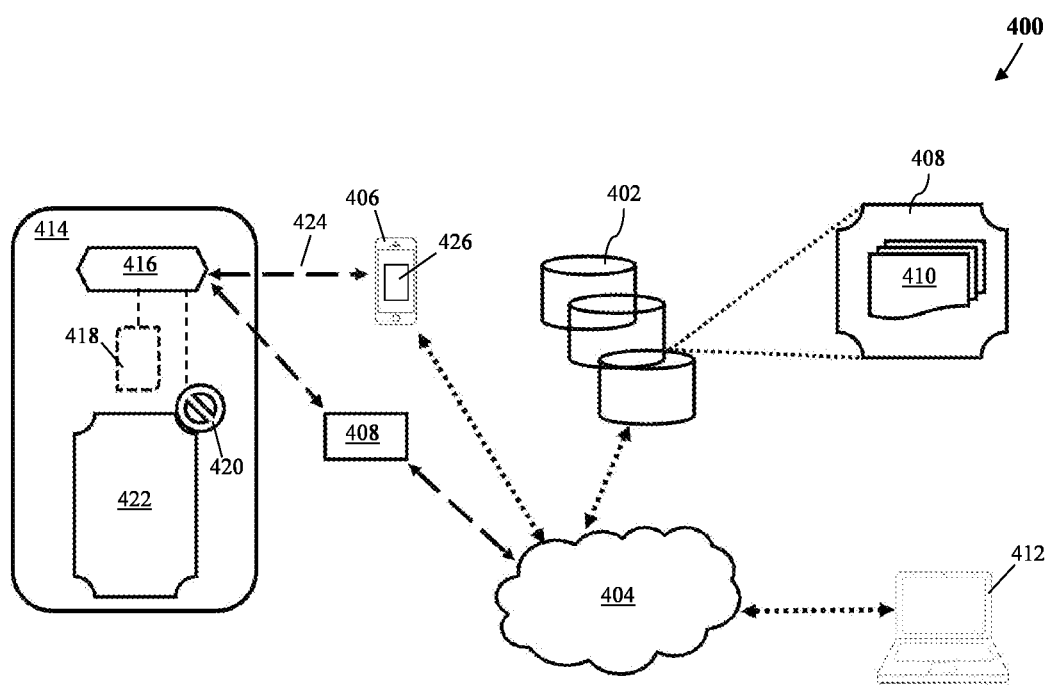
FIG. 4 is a functional block diagram of an electronic access control system, in accordance with certain aspects of the present disclosure.

Referring now to FIG. 4, a functional block diagram of an electronic access control system 400 for preventing, controlling, mitigating and/or resolving an arc flash precondition within an enclosure 414 is shown. In accordance with various aspects of the present disclosure, system 400 may be incorporated within or embodied as system 100 of FIG. 1. In accordance with various embodiments, system 400 comprises an electronic access control unit (ACU) 416 capable of communicating with one or more cloud server 402 via a communication network 404 to send activity data from ACU 416 to one or more cloud server 402. In accordance with various aspects of the present disclosure, activity data may comprise sensor data received from one or more sensor 418, access request data received from mobile phone gateway 424, output data associated with one or more data processing routines of ACU 416. In various embodiments, communication network 404 comprises one or more LAN, WAN, wireless network, cellular network, Internet, the like, or combinations thereof. In various embodiments, cloud server 402 comprises an IoT platform with various applications for ingestion of data generated by ACU 416, stream analytics and safety guidance policies, action including actuation of door lock 420 configured to lock and unlock door 422, data storage, and device management. In one implementation, ACU 416 communicates with cloud server 402 via a mobile phone gateway 424. In another implementation ACU 416 with cloud server 402 via a gateway router 408. The said cloud server and services are commonly referred to as "cloud computing", "on-demand computing", "software as a service (SaaS)", "platform computing", "network-accessible platform", "cloud services", "data centers," and the like. The term "cloud" can include a collection of hardware and software that forms a shared pool of configurable computing resources (e.g., networks, servers, storage, applications, services, etc.), which can be suitably provisioned to provide on-demand self-service, network access, resource pooling, elasticity and measured service, among other features. In various embodiments, cloud-based server 402 comprises one or more software application (API) 408 to enable the development of one or more software application product 410 providing one or more functions, including but not limited to, data processing, data analysis, data presentation in graphical form, data annotation, or the like. In certain embodiments, software application product 410 is hosted on cloud-based server 402. In various embodiments, software application product 410 comprises one or more logic flows to enable a system and methods for collecting, processing, and synthesizing insights from at least one ACU 416, mobile client 406, or mobile phone gateway 424. In various embodiments, at least one application 410 enables the retrieval or distribution of one or more said logic flows for controlling access to enclosure 414 and enforcing one or more safety and compliance workflows. In various embodiments, a user (e.g., a supervisor or administrator) may access data insights from a desktop client 412. Similarly, a technician may access instructions or guidance from a mobile client 406, or vice versa. In one implementation, mobile client 406 comprises a mobile software program 426 capable of communicating with cloud-server 402 to access said information. Similarly, desktop client 412 may access cloud-based server 402 via communication network 404. In various embodiments, a client device (e.g., mobile phone, mobile computing device, PC, etc.) is communicably engaged with the cloud-based server 402 to receive one or more assets configured to render one or more graphical user interface (GUI) elements of mobile software program 426 and one or more instructions/commands being operable to run one or more current instance, historical instance, prediction, recommendation, or combinations thereof, for safety, compliance, prevention, mitigation and/or resolution of an arc flash precondition. In various embodiments, historical instances, reports and real-time notifications reflect all steps that occurred for enclosure 414. In various embodiments, one or more historical instances of mobile software program 426 enable the prevention and after-action analyses to better identify and analyze one or more arc flash root issue. In various embodiments, cloud-based server 402 may be communicably engaged with one or more third-party systems, servers and/or applications to better enable safety, compliance, prevention, mitigation and/or resolution of an arc flash precondition within enclosure 414.

Figure 5:
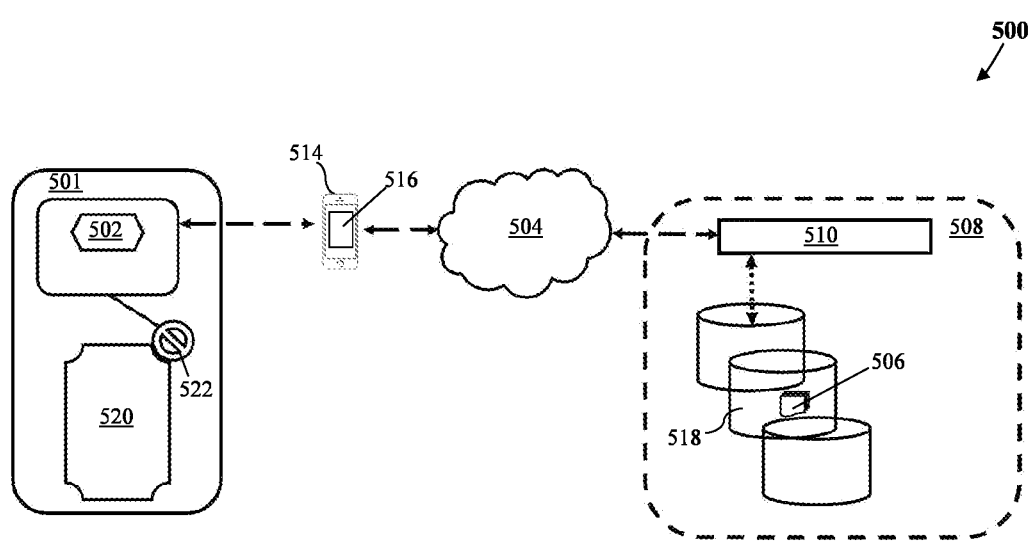
FIG. 5 is an architecture diagram of an electronic access control system comprising a private network (PN) architecture, in accordance with certain aspects of the present disclosure.

Referring now to FIG. 5, an architecture diagram of an electronic access control system 500 comprising a private network (PN) architecture is shown. In accordance with various aspects of the present disclosure, system 500 may be incorporated within or embodied as system 100 of FIG. 1. In accordance with various embodiments, system 500 comprises an Electronic Access Control Unit (ACU) 502 being communicably engaged with a mobile client 514 to send and receive communications therebetween. Mobile client 514 may comprise an electronic access management application 516 that enables a user to access one or more remote sites comprising at least one access-restricted enclosure 501. In certain embodiments, access-restricted enclosure 501 is secured by a door 520 being secured by an electronic locking mechanism 522. Electronic locking mechanism 522 may be operably engaged with ACU 502 to actuate between a locked state and an unlocked state. In accordance with an embodiment, electronic access management application 516 enables a data transfer interface between mobile client 514 and ACU 502. In accordance with certain embodiments, mobile client 514 is communicably engaged with at least one cloud server 518 via network 504 to enable a data transfer interface between electronic access management application 516 and an identity and access management software application (IAS) 506. Network 504 may be configured as a private network (PN) that does not transfer data over a public Internet connection. In certain embodiments, mobile client 514 is authenticated and authorized via a direct connection between with Network Operations Center (NOC) 508, optionally comprising one or more network firewall 510. In certain embodiments, no public IP address or Certificate Signing Request (CSR) is required for establishing communication with NOC 508. In certain implementations, IAS 506 authorizes a user via an interactive voice response module to authenticate the user and grant access to enclosure 501. In response to identifying an arc flash precondition or arc flash event, IAS 506 may configure one or more system parameters to deny access to enclosure 501 by sending control instructions to electronic access management application 516. IAS 506 may further configure and communicate one or more safety and compliance workflows to electronic access management application 516 to ensure user compliance with one or more safety protocols and grant temporary access to enclosure 501. In various embodiments, electronic access management application 516 comprises a graphical user interface comprising one or more interface elements to enable one or more features, including but not limited to, user access validation, activity audit trail, generation of remote site access codes, and notes. In various embodiments, IAS 506 comprises a lock management software system hosted on one or more cloud servers 518 within NOC 508. In an implementation, IAS 506 contains remote site and user information for all users within system 500. In another implementation, IAS 506 authenticates user access privileges prior to granting access to a site. In yet another implementation, one or more graphical user interface enables a user to query and filter data to enable one or more access management and audit functions. In various embodiments, IAS 506 may be configured to provide real-time reporting of data to one or more users to enable analytics and customized reporting for complete insight into a site and user access activity.

Figure 6:
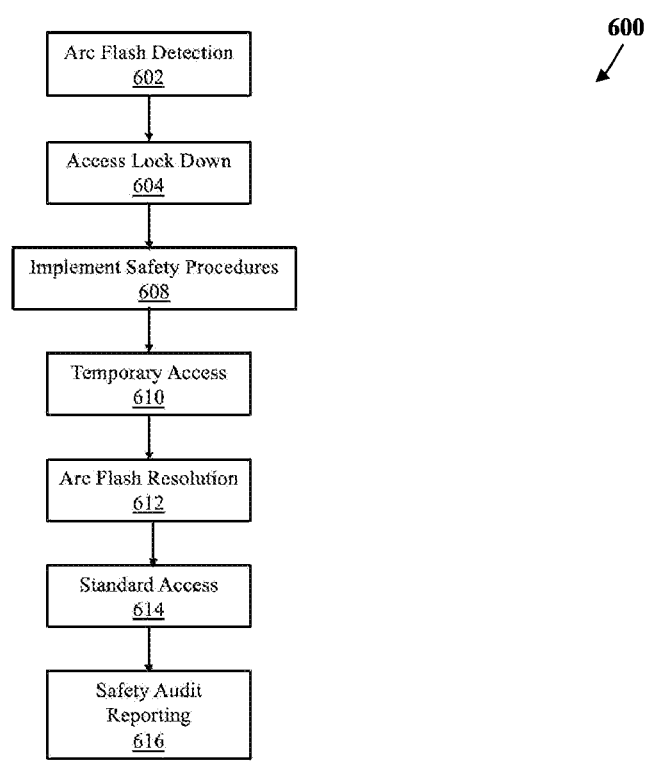
FIG. 6 is a process flow diagram of an electronic access control method, in accordance with certain aspects of the present disclosure.

FIG. 6 is a process flow diagram of an electronic access control method 600. In accordance with various aspects of the present disclosure, method 600 may be incorporated within one or more aspects and/or routines of system 100 of FIG. 1. Method 600 comprises various steps for preventing, mitigating, managing and resolving an arc flash precondition or arc flash event within an access-controlled enclosure containing electrical equipment. In accordance with certain embodiments, method 600 may be initiated by receiving a sensor input by an electronic access control unit and processing the sensor input to detect an occurrence of an arc flash precondition or arc flash event within the enclosure (Step 602). Method 600 may continue by communicating, with the electronic access control unit via one or more alarm, switch and/or network interfaces, the occurrence of an arc flash precondition or arc flash event within the enclosure and configuring an access lock down state for the enclosure (Step 604). The access lock down state may be configured by the electronic access control unit and/or a remote server communicably engaged with the electronic access control unit. Method 600 may continue by implementing one or more safety procedures and protocols for mitigating and resolving the arc flash precondition or arc flash event, which may include one or more compliance workflows such as management notification and verification of technician safety gear and training (Step 608). Method 600 may continue by granting temporary access to one or more authorized users who have completed the one or more compliance workflows and have been approved for access by the remote server and/or one or more administrator users (Step 610). Method 600 may continue by verifying a resolution of the arc flash event or arc flash precondition in the enclosure (Step 612). Method 600 may verify resolution of the arc flash event or arc flash precondition via one or more user responses or user-generated inputs and/or one or more processing steps executed on the electronic access control unit and/or the remote server. Method 600 may continue by enabling, with the electronic access control unit and/or the remote server, one or more standard access protocols for the enclosure in response to the resolution of the arc flash event or arc flash precondition (Step 614). In accordance with certain aspects of the present disclosure, method 600 may conclude by generating, either automatically or ad hoc, one or more safety audit reports for the arc flash event or arc flash precondition (Step 616). The one or more safety audit reports may include event data to reflect all steps that occurred for the enclosure. The one or more safety audit reports may be utilized for arc flash prevention and post-mortem analyses to gain insights for future prevention and improved safety protocols.

Figure 7:
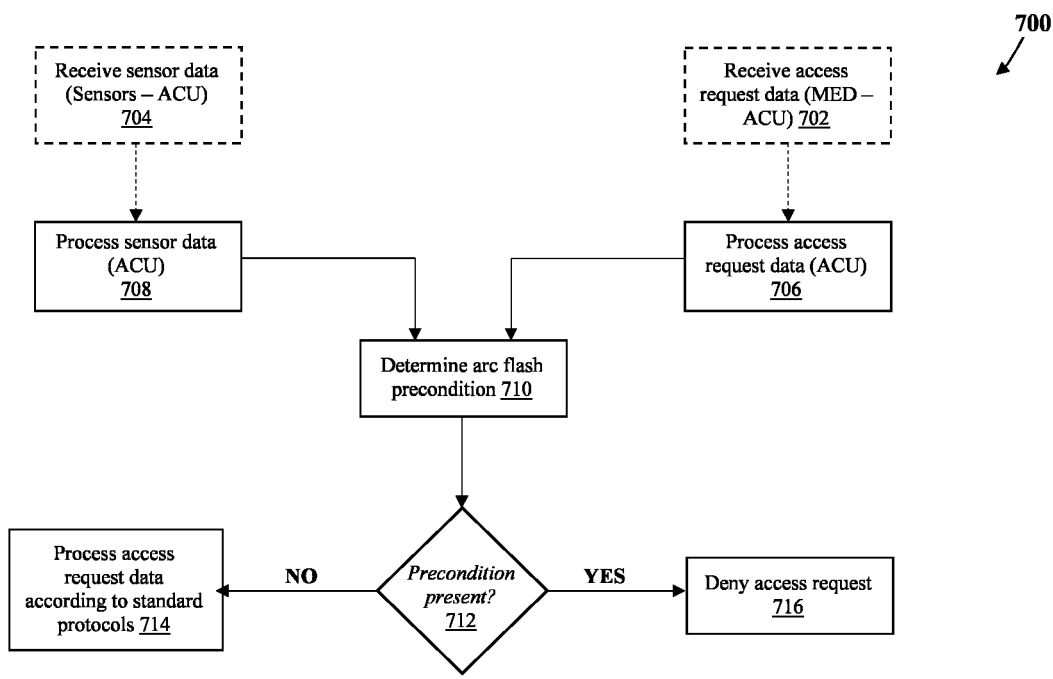
FIG. 7 is a process flow diagram of a routine of an electronic access control method and system, in accordance with certain aspects of the present disclosure.

Referring now to FIG. 7, a process flow diagram of a routine 700 of an electronic access control method and system is shown. In accordance with certain aspects of the present disclosure, routine 700 may be incorporated within one or more aspects of system 100 of FIG. 1. Routine 700 may be incorporated within one or more process steps of method 600 of FIG. 6 and/or may include one or more sub-steps of method 600 of FIG. 6. Routine 700 may be embodied within one or more processor-executable instructions to command one or more operations of an electronic access control unit, mobile electronic device and/or a remote server, as shown and described in FIGS. 1-5. In accordance with certain aspects of the present disclosure, routine 700 may comprise one or more of process flow steps 702-716. In accordance with certain embodiments, routine 700 may comprise one or more data receiving steps to receive access data communicated from a mobile electronic device to an ACU (Step 702) and receive sensor data communicated from one or more sensors to the ACT (Step 704). Routine 700 may comprise one or more data processing steps to process the sensor data (Step 708) and process the access request data (Step 706). In certain embodiments, the output of the one or more data processing steps is evaluated to determine the presence of an arc flash precondition based on the sensor data (Step 710). In accordance with certain embodiments, step 710 is configured to compare the sensor data to one or more predetermined threshold values being stored in memory to determine if the sensor data exceeds the threshold values. In certain embodiments, the one or more predetermined threshold values are correlated with one or more arc flash precondition and/or arc flash event. Routine 700 may comprise a decision step 712 on the output of step 710 to determine if an arc flash precondition is present based on whether the sensor data exceeds a threshold value. If NO, then routine 700 continues by processing the access request data according to one or more standard protocols for authenticating and authorizing an access request (Step 714). If YES, then routine 700 continues by denying the access request (Step 716) and restricting access to the enclosure.

Figure 8:
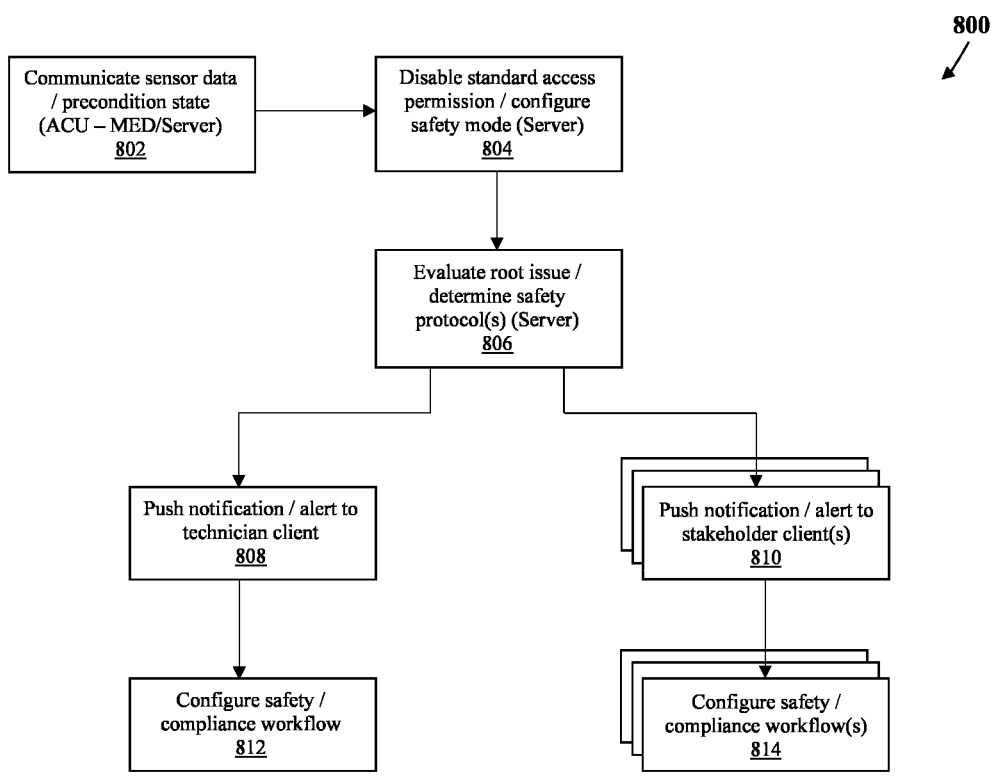
FIG. 8 is a process flow diagram of a routine of an electronic access control method and system, in accordance with certain aspects of the present disclosure.

Referring now to FIG. 8, a process flow diagram of a routine 800 of an electronic access control method and system is shown. In accordance with certain aspects of the present disclosure, routine 800 may be incorporated within one or more aspects of system 100 of FIG. 1. Routine 800 may be incorporated within one or more process steps of method 600 of FIG. 6 and/or may include one or more sub-steps of method 600 of FIG. 6. Routine 800 may be embodied within one or more processor-executable instructions to command one or more operations of an electronic access control unit, mobile electronic device and/or a remote server, as shown and described in FIGS. 1-5. In certain embodiments, routine 800 may comprise a continuation of one or more steps of routine 700. In accordance with certain aspects of the present disclosure, routine 800 may comprise one or more of process flow steps 802-814. In accordance with certain embodiments, routine 800 may comprise operations for communicating sensor data and/or data indicative of an arc flash precondition state or arc flash event to the mobile electronic device and/or remote server (Step 802). Routine 800 may continue by executing one or more operations to disable standard access permissions for the ACU and/or one or more users and may configure one or more application settings to comprise a safety/restricted access mode of operation for the ACU (Step 804). Routine 800 may continue by executing one or more processing steps to evaluate a root issue of the arc flash precondition and determine one or more safety protocols based on the arc flash precondition (Step 806). Routine 800 may continue by executing one or more communication steps comprising communicating a push notification or alert message to a client device associated with a technician user (Step 808) and communicating a push notification or alert message to one or more client device(s) associated with one or more other users or stakeholders (Step 810). Routine 800 may continue by executing one or more application configuration steps comprising configuring at least one safety and compliance workflow for the technician user (Step 812) and configuring at least one safety and compliance workflow for one or more other users or stakeholders (Step 814).

Figure 9:
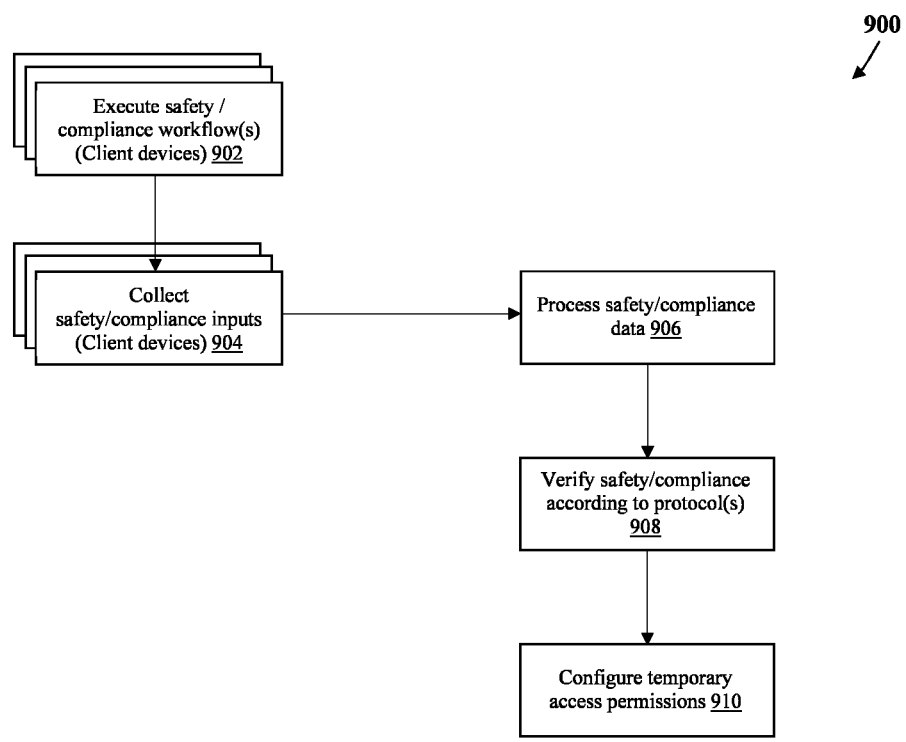
FIG. 9 is a process flow diagram of a routine of an electronic access control method and system, in accordance with certain aspects of the present disclosure.

Referring now to FIG. 9, a process flow diagram of a routine 900 of an electronic access control method and system is shown. In accordance with certain aspects of the present disclosure, routine 900 may be incorporated within one or more aspects of system 100 of FIG. 1. Routine 900 may be incorporated within one or more process steps of method 600 of FIG. 6 and/or may include one or more sub-steps of method 600 of FIG. 6. Routine 900 may be embodied within one or more processor-executable instructions to command one or more operations of an electronic access control unit, mobile electronic device and/or a remote server, as shown and described in FIGS. 1-5. In certain embodiments, routine 900 may comprise a continuation of one or more steps of routine 800. In accordance with certain aspects of the present disclosure, routine 900 may comprise one or more of process flow steps 902-910. In accordance with certain embodiments, routine 900 may comprise operations for executing one or more safety and compliance workflows across one or more client devices (Step 902). Routine 900 may continue by executing one or more data collection and communication steps comprising collecting one or more user-generated inputs from the one or more safety and compliance workflows across the one or more client devices and communicating the one or more user-generated inputs to the server (Step 904). Routine 900 may continue by executing operations for receiving the one or more user-generated inputs comprising a plurality of safety and compliance data and processing the safety and compliance data according to one or more data processing operations (Step 906). Routine 900 may continue by utilizing the output of step 906 to execute one or more operations for verifying safety and compliance of at least one user according to one or more safety and compliance protocol(s) (Step 908). In certain embodiments, the one or more safety and compliance protocol(s) may comprise one or more rules or rules engine. Routine 900 may continue by utilizing the output of step 908 to configure temporary access permissions for one or more compliant user (Step 910).

Figure 10:
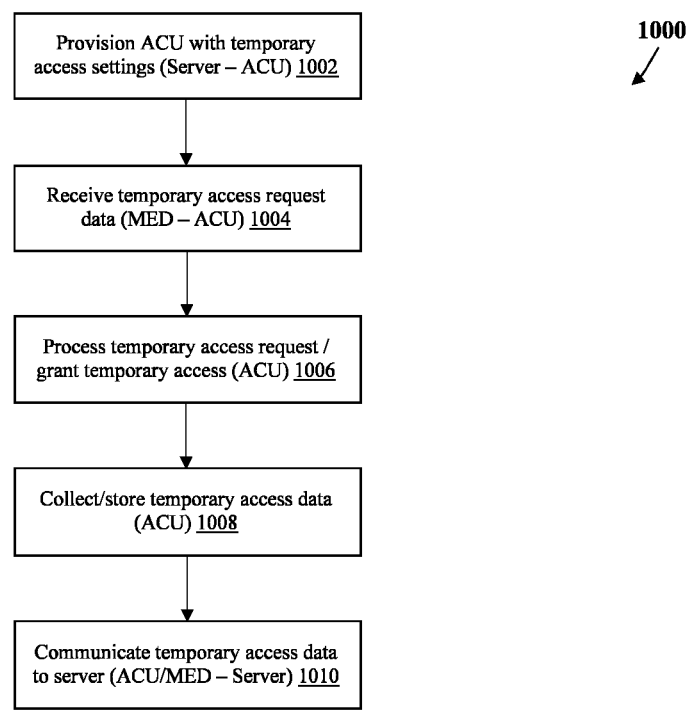
FIG. 10 is a process flow diagram of a routine of an electronic access control method and system, in accordance with certain aspects of the present disclosure.

Referring now to FIG. 10, a process flow diagram of a routine 1000 of an electronic access control method and system is shown. In accordance with certain aspects of the present disclosure, routine 1000 may be incorporated within one or more aspects of system 100 of FIG. 1. Routine 1000 may be incorporated within one or more process steps of method 600 of FIG. 6 and/or may include one or more sub-steps of method 600 of FIG. 6. Routine 1000 may be embodied within one or more processor-executable instructions to command one or more operations of an electronic access control unit, mobile electronic device and/or a remote server, as shown and described in FIGS. 1-5. In certain embodiments, routine 1000 may comprise a continuation of one or more steps of routine 900. In accordance with certain aspects of the present disclosure, routine 1000 may comprise one or more of process flow steps 1002-1010. In accordance with certain embodiments, routine 1000 may comprise operations for provisioning the ACU with temporary access settings (Step 1002). Routine 1000 may continue by executing one or more operations for receiving temporary access request data at a processing unit of ACU (Step 1004). Routine 1000 may utilize the output of step 1004 to process the temporary access request data and grant temporary access in response to the data being valid and authorized (Step 1006). Routine 1000 may continue by executing one or more operations for collecting temporary access data (e.g. from one or more sensors) and receiving storing temporary access data in at least one memory device of ACU and/or the mobile electronic device (Step 1008). Routine 1000 may continue by executing one or more operations for communicating the temporary access data from the ACU and/or mobile electronic device to the remote server (Step 1010).

Figure 11:
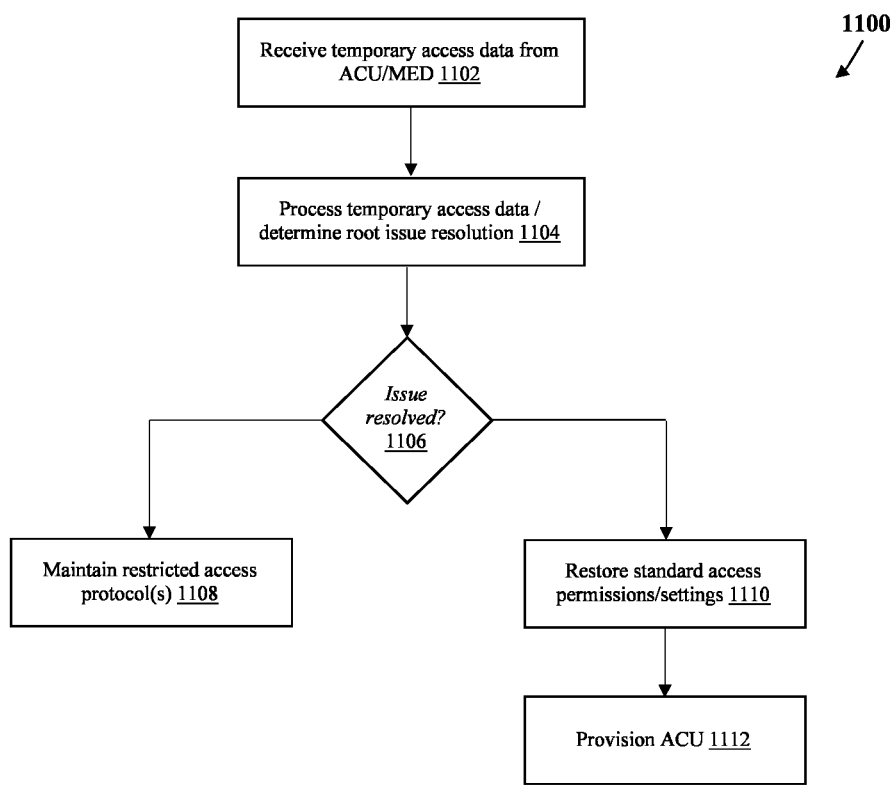
FIG. 11 is a process flow diagram of a routine of an electronic access control method and system, in accordance with certain aspects of the present disclosure.

Referring now to FIG. 11, a process flow diagram of a routine 1100 of an electronic access control method and system is shown. In accordance with certain aspects of the present disclosure, routine 1100 may be incorporated within one or more aspects of system 100 of FIG. 1. Routine 1100 may be incorporated within one or more process steps of method 600 of FIG. 6 and/or may include one or more sub-steps of method 600 of FIG. 6. Routine 1100 may be embodied within one or more processor-executable instructions to command one or more operations of an electronic access control unit, mobile electronic device and/or a remote server, as shown and described in FIGS. 1-5. In certain embodiments, routine 1100 may comprise a continuation of one or more steps of routine 1000. In accordance with certain aspects of the present disclosure, routine 1100 may comprise one or more of process flow steps 1102-1112. In accordance with certain embodiments, routine 1100 may comprise operations for receiving temporary access data from the ACU and/or mobile electronic device (Step 1102) and processing the temporary access data to determine resolution of at least one arc flash root issue (Step 1104). Routine 1100 may comprise a decision step 1106 based on the output of step 1104 to determine if the at least one arc flash root issue has been resolved. If NO, routine 1100 continues by executing operations for maintaining the restricted access protocol(s) for the arc flash precondition/event (Step 1108). If YES, routine 1100 continues by executing operations for restoring standard access permissions and/or settings from prior to the arc flash precondition/event (Step 1110). Routine 1100 may conclude by executing operations for provisioning the ACU with the restored standard access permissions and/or settings based on the output of step 1110 (Step 1112).

Figure 12:
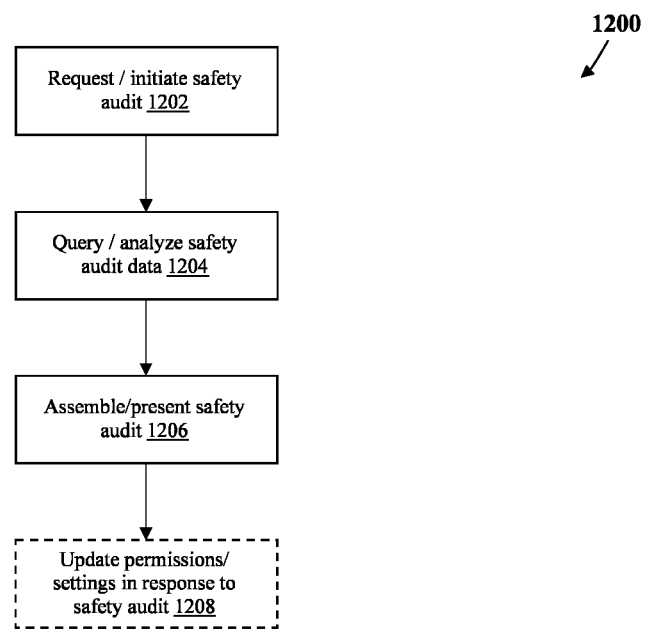
FIG. 12 is a process flow diagram of a routine of an electronic access control method and system, in accordance with certain aspects of the present disclosure.

Referring now to FIG. 12, a process flow diagram of a routine 1200 of an electronic access control method and system is shown. In accordance with certain aspects of the present disclosure, routine 1200 may be incorporated within one or more aspects of system 100 of FIG. 1. Routine 1200 may be incorporated within one or more process steps of method 600 of FIG. 6 and/or may include one or more sub-steps of method 600 of FIG. 6. Routine 1200 may be embodied within one or more processor-executable instructions to command one or more operations of an electronic access control unit, mobile electronic device and/or a remote server, as shown and described in FIGS. 1-5. In certain embodiments, routine 1200 may comprise a continuation of one or more steps of routine 1100. In accordance with certain aspects of the present disclosure, routine 1200 may comprise one or more of process flow steps 1202-1208. In accordance with certain embodiments, routine 1200 may comprise one or more operations for requesting or initiating a safety audit workflow from one or more client devices to the server (Step 1202). Routine 1200 may be configured to query and analyze safety audit data being stored in at least one database communicably engaged with the server in accordance with one or more user inputs and/or data processing operations (Step 1204). Routine 1200 may continue by executing one or more operations for assembling the safety audit data and presenting the safety audit data to one or more client devices via a graphical user interface or file format (Step 1206). In certain embodiments, routine 1200 may comprise one or more steps for updating one or more electronic access permissions and/or settings by at least one user in response to receiving the safety audit (Step 1208).

Figure 13:
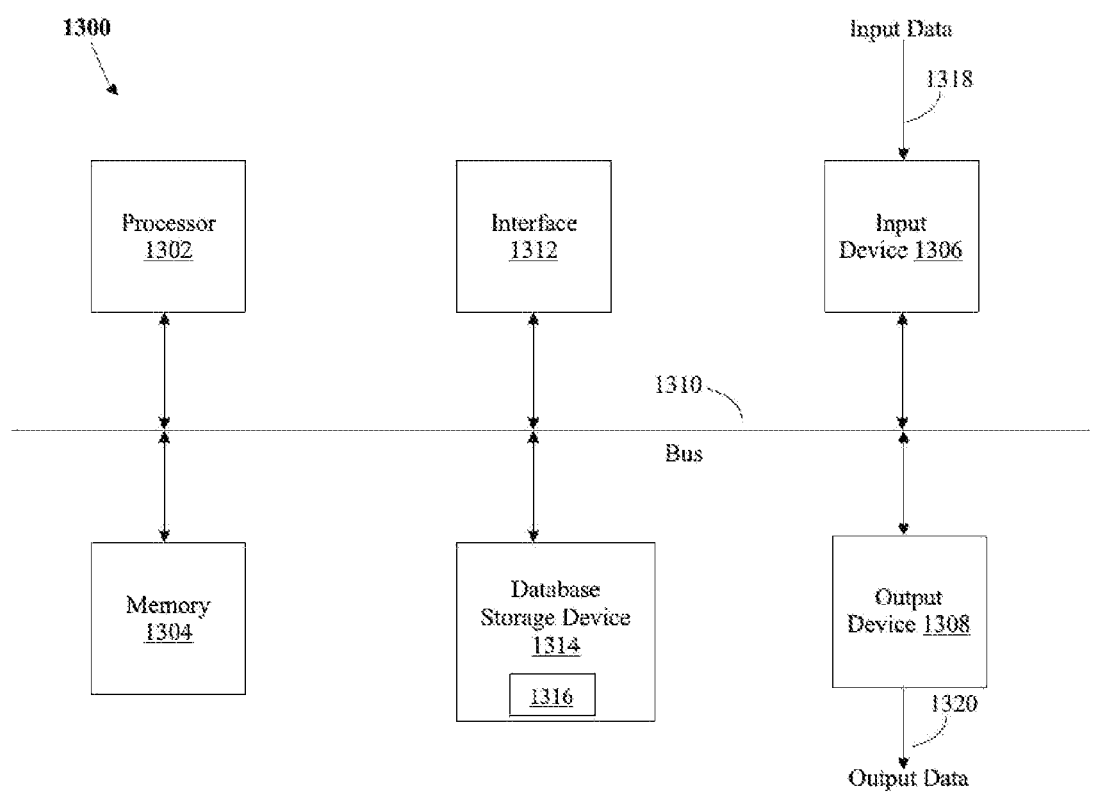
FIG. 13 is an architecture diagram of an exemplary processor-implemented computing system in which one or more aspects of the present disclosure may be implemented.

Referring now to FIG. 13, a processor-implemented computing device in which one or more aspects of the present disclosure may be implemented is shown. According to an embodiment, a processing system 1300 may generally comprise at least one processor 1302, a memory 1304, an input device 1306 for receiving input data 1318 and an output device 1308 that produces output data 1320 coupled together with at least one bus 1310. In certain embodiments, input device 1306 and output device 1308 could be the same device. An interface 1312 can also be provided for coupling the processing system 1300 to one or more peripheral devices, for example interface 1312 could be a PCI card or PC card. At least one database storage device 1314 which houses at least one database 1316 can also be provided. The memory 1304 can be any form of memory device, for example, volatile or non-volatile memory, solid state storage devices, magnetic devices, etc. The processor 1302 could comprise more than one distinct processing device, for example to handle different functions within the processing system 1300. Input device 1306 receives input data 1318 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 1318 could come from different sources, for example keyboard instructions in conjunction with data received via a network. Output device 1308 produces or generates output data 1320 and can comprise, for example, a display device or monitor in which case output data 1320 is visual, a printer in which case output data 1320 is printed, a port for example a USB port, a peripheral component adaptor, a data transmitter or antenna such as a modem or wireless network adaptor, etc. Output data 1320 could be distinct and derived from different output devices, for example a visual display on a monitor in conjunction with data transmitted to a network. A user could view data output, or an interpretation of the data output, on, for example, a monitor or using a printer. The storage device 1314 can be any form of data or information storage means, for example, volatile or non-volatile memory, solid state storage devices, magnetic devices, etc.

In use, the processing system 1300 is adapted to allow data or information to be stored in and/or retrieved from, via wired or wireless communication means, at least one database 1316. The interface 1312 may allow wired and/or wireless communication between the processing unit 1302 and peripheral components that may serve a specialized purpose. In general, the processor 1302 can receive instructions as input data 1318 via input device 1306 and can display processed results or other output to a user by utilizing output device 1308. More than one input device 1306 and/or output device 1308 can be provided. It should be appreciated that the processing system 1300 may be any form of terminal, server, specialized hardware, or the like.

It is to be appreciated that the processing system 1300 may be a part of a networked communications system. Processing system 1300 could connect to a network, for example the Internet or a WAN. Input data 1318 and output data 1320 could be communicated to other devices via the network. The transfer of information and/or data over the network can be achieved using wired communications means or wireless communications means. A server can facilitate the transfer of data between the network and one or more databases. A server and one or more databases provide an example of an information source. For example, processing system 1300 may establish a data transfer interface with a remote server, for example over a public Internet, and send and receive data to and from the server in accordance with one or more data transfer protocols, including Hypertext Transfer Protocol (HTTP)/Hypertext Transfer Protocol Secure (HTTPS). In accordance with certain data transfer protocols, processing system 1300 may be configured to resolve a domain name of a remote server with Domain Name System (DNS) servers. The DNS may resolve queries for these names into IP addresses for the purpose of locating processing system 1300 and its services. Processing system 1300 may establish a Transmission Control Protocol (TCP) connection with the remote server. HTTP or HTTPS protocol may be adopted to transmit application data between the app and the corresponding servers. According to various embodiments, the data transfer protocols may comprise the transmission and or reception of one or more requests (e.g., web service request) and responses (e.g., arc sensor status) between a resource and a client via one or more servers using one or more communication protocols (e.g., UDP, TCP, etc.) in conjunction with a resource observation. In various embodiments, one or more IoT application uses one or more web services to process data. One or more application may comprise one or more data and control inputs, processing logic, and outputs. In accordance with certain aspects of the present disclosure, input data may comprise a sensor reading or an output of ACU 202 (shown in FIG. 2).

Thus, the processing system 1300 illustrated in FIG. 13 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 13 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the processing system 1300 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 1300, or portions thereof, may be stored in a remote memory storage device. It is to be appreciated that the illustrated network connections of FIG. 13 are exemplary and other means of establishing a communications link between multiple computers may be used.

FIG. 13 is intended to provide a brief, general description of an illustrative and/or suitable exemplary environment in which various embodiments of the invention may be implemented. FIG. 13 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the processing system 1300 of FIG. 13. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments of the present invention can be implemented with numerous other general-purpose or special-purpose computing devices, systems or configurations. Examples of well-known computing systems, environments, and configurations suitable for use in embodiment of the invention include personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Various embodiments of the invention will be described herein in a general context of computer-executable instructions, such as program modules, being executed by a computer. Generally, program modules include routines, programs, objects, components, data structures, etc., that perform particular tasks or implement particular abstract data types. In certain embodiments, distributed computing environments where tasks are performed by remote processing devices that are linked through a communications network may also be employed. In distributed computing environments, program modules may be located in both local and remote computer storage media including memory storage devices.

With the general computing system environment 1300 of FIG. 13 being shown and discussed above, the following description and remaining figures pertain to various exemplified embodiments of the present invention generally relating to systems and methods for detecting, with at least one sensor communicably engaged with a controller comprising at least one processor, an occurrence of a precondition for an arc flash in an enclosure; communicating, with the controller via a communications interface, the precondition for the arc flash to at least one remote server or mobile electronic device; restricting, with the controller, access to the enclosure in response to the precondition for an arc flash in the enclosure; verifying, with the at least one remote server, user compliance with one or more arc flash safety protocols; configuring, with the at least one remote server communicably engaged with the controller, temporary access to the enclosure to an authorized user; verifying, with the at least one remote server, a resolution of the precondition for the arc flash in the enclosure; and, enabling, with the access controller, one or more standard access protocols for the enclosure in response to the resolution of the precondition for the arc flash.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions (i.e., computer-executable instructions) may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s). Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrases are used herein, a processor may be "operable to" or "configured to" perform a certain function in a variety of ways, including, for example, by having one or more general-purpose circuits perform the function by executing particular computer-executable program code embodied in computer-readable medium, and/or by having one or more application-specific circuits perform the function.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." As used herein, the terms "right," "left," "top," "bottom," "upper," "lower," "inner" and "outer" designate directions in the drawings to which reference is made.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. An electronic access control system comprising:
    at least one sensor configured to detect at least one arc flash precondition or arc flash event for an enclosure;
    a controller communicably engaged with the at least one sensor to receive a sensor input, the controller comprising at least one data transfer interface configured to receive electronic access credentials from an input device, wherein the controller is configured to actuate at least one locking mechanism for the enclosure in response to processing the electronic access credentials according to one or more electronic access control parameters; and
    a processing unit communicably engaged with the controller to receive sensor data associated with the sensor input, the processing unit comprising at least one processor operably engaged with at least one non-transitory computer-readable medium having one or more processor-executable instructions stored thereon that, when executed, cause the at least one processor to perform one or more operations, the one or more operations comprising:
    processing the sensor data to determine at least one arc flash precondition or arc flash event for the enclosure;
    configuring the one or more electronic access control parameters to deny the access request in response to the sensor data being indicative of the at least one arc flash precondition or arc flash event;
    configuring at least one arc flash safety protocol in response to the sensor data being indicative of the at least one arc flash precondition or arc flash event,
    wherein the at least one arc flash safety protocol comprises communicating a notification of the at least one arc flash precondition or arc flash event to an administrator user,
    wherein the at least one arc flash safety protocol comprises configuring a compliance workflow comprising one or more steps for verifying one or more safety or compliance requirements for a technician user;
    granting temporary access to the technician user in response to an approval by the administrator user, wherein the approval comprises verification by the administrator user that the technician user has completed the compliance workflow;
    verifying resolution of the at least one arc flash precondition or arc flash event in response to receiving one or more user-generated inputs from one or both of the technician user and the administrator user; and
    enabling one or more standard access protocols for the enclosure in response to the verifying resolution of the at least one arc flash precondition or arc flash event.

2. The electronic access control system of claim 1 wherein the input device is communicably engaged with the processing unit via a network interface, wherein the network interface comprises a private network interface that does not transfer data over a public Internet connection.

3. The electronic access control system of claim 1 wherein the input device comprises a mobile computing device comprising at least one electronic access control application executing thereon, wherein the at least one electronic access control application comprises a graphical user interface configured to present one or more user prompts and receive one or more user inputs according to the at least one arc flash safety protocol.

4. The electronic access control system of claim 1 wherein the one or more operations of the processing unit further comprise provisioning the controller with temporary access settings for the technician user.

5. The electronic access control system of claim 1 wherein the one or more operations further comprise generating one or more safety audit reports for the at least one arc flash precondition or arc flash event in the enclosure.

6. The electronic access control system of claim 5 wherein the one or more safety audit reports comprise event data associated with resolution steps for the at least one arc flash precondition or arc flash event in the enclosure.

7. An electronic access control method comprising:
  detecting, with at least one sensor communicably engaged with a controller comprising at least one processor, an occurrence of a precondition for an arc flash in an enclosure;
  communicating, with the controller via a network interface, the precondition for the arc flash to at least one processing unit, wherein the at least one processing unit is communicably engaged with the controller via the network interface;
  disabling, with the controller, one or more standard access protocols for the enclosure in response to the precondition for the arc flash in the enclosure to restrict access to the enclosure;
  configuring, with the at least one processing unit, at least one arc flash safety protocol,
  wherein the at least one arc flash safety protocol comprises communicating a notification of the precondition for the arc flash in the enclosure to an administrator user,
  wherein the at least one arc flash safety protocol comprises configuring a compliance workflow comprising one or more steps for verifying one or more safety or compliance requirements for a technician user;
  granting, with the controller, a temporary access permission for the enclosure to the technician user in response to an approval by the administrator user, wherein the approval comprises verification by the administrator user that the technician user has completed the compliance workflow;
  verifying, with the at least one processing unit, resolution of the precondition for the arc flash in the enclosure in response to receiving one or more user-generated inputs from one or both of the technician user and the administrator user; and
  enabling, with the controller, the one or more standard access protocols for the enclosure in response to verifying resolution of the precondition for the arc flash in the enclosure.

8. The electronic access control method of claim 7 further comprising communicating, with the at least one processing unit via the network interface, the at least one arc flash safety protocol to at least one client device.

9. The electronic access control method of claim 8 further comprising receiving, with the at least one client device, one or more user inputs in response to the at least one arc flash safety protocol.

10. The electronic access control method of claim 9 further comprising communicating, with the at least one client device via the network interface, the one or more user inputs to the at least one processing unit.

11. The electronic access control method of claim 7 further comprising communicating, with the least one processing unit via the network interface, the precondition for the arc flash to at least one client device.

12. The electronic access control method of claim 7 further comprising assembling, with the at least one processing unit, safety audit data for the enclosure, wherein the safety audit data comprises event data to reflect all steps that occurred for the enclosure.

13. The electronic access control method of claim 7 wherein the controller is operably engaged with at least one electronic locking device configured to selectively restrict access to the enclosure.

14. The electronic access control method of claim 7 wherein the network interface comprises a private network that does not transfer data over a public Internet connection.

15. The electronic access control method of claim 7 further comprising generating, with the at least one processing unit, one or more safety audit reports for the precondition for the arc flash in the enclosure.

16. The electronic access control method of claim 15 wherein the one or more safety audit reports comprise event data associated with the resolution of the precondition for the arc flash in the enclosure.

17. The electronic access control method of claim 16 further comprising providing, with the at least one processing unit, the one or more safety audit reports to at least one client device communicably engaged with the at least one processing unit.

18. A non-transitory computer-readable medium encoded with instructions for commanding one or more processors to execute operations for preventing an arc flash in an enclosure, the operations comprising:
  receiving sensor data comprising one or more sensor inputs from an interior portion of the enclosure;
  processing the sensor data to determine at least one arc flash precondition or arc flash event for the enclosure;
  restricting one or more electronic access permissions for the enclosure in response to the sensor data being indicative of the at least one arc flash precondition or arc flash event;
  configuring at least one arc flash safety protocol in response to the sensor data being indicative of the at least one arc flash precondition or arc flash event,
  wherein the at least one arc flash safety protocol comprises communicating a notification of the at least one arc flash precondition or arc flash event to an administrator user,
  wherein the at least one arc flash safety protocol comprises configuring a compliance workflow comprising one or more steps for verifying one or more safety or compliance requirements for a technician user;
  granting temporary access to the technician user in response to an approval by the administrator user, wherein the approval comprises verification that the technician user has completed the compliance workflow;
  verifying resolution of the at least one arc flash precondition or arc flash event in response to receiving one or more user-generated inputs from one or both of the technician user and the administrator user; and restoring the one or more electronic access permissions for the enclosure in response to the resolution of the at least one arc flash precondition or arc flash event.

19. The non-transitory computer-readable medium of claim 18 wherein the operations further comprise provisioning temporary access settings for the technician user.

20. The non-transitory computer-readable medium of claim 18 wherein the operations further comprise generating one or more safety audit reports in response to the resolution of the at least one arc flash precondition or arc flash event, wherein the one or more safety audit reports comprise event data associated with the resolution of the at least one arc flash precondition or arc flash event.

* * * * *